(12) United States Patent
Izume

(10) Patent No.: US 11,046,067 B2
(45) Date of Patent: Jun. 29, 2021

(54) PRINTING MACHINE PROVIDED WITH PLATE CYLINDER DRIVING DEVICE

(71) Applicant: I.MER CO., LTD., Kyoto (JP)

(72) Inventor: Masayuki Izume, Kyoto (JP)

(73) Assignee: I.MER CO., LTD., Kyoto (JP)

( * ) Notice: Subject to any disclaimer, the term of this patent is extended or adjusted under 35 U.S.C. 154(b) by 419 days.

(21) Appl. No.: 16/311,910

(22) PCT Filed: Jun. 15, 2017

(86) PCT No.: PCT/JP2017/022037
§ 371 (c)(1),
(2) Date: Dec. 20, 2018

(87) PCT Pub. No.: WO2018/008344
PCT Pub. Date: Jan. 11, 2018

(65) Prior Publication Data
US 2019/0210356 A1    Jul. 11, 2019

(30) Foreign Application Priority Data
Jul. 4, 2016    (JP) .............................. JP2016-132732

(51) Int. Cl.
| | |
|---|---|
| *B41F 13/012* | (2006.01) |
| *B41F 13/14* | (2006.01) |
| *F16H 55/18* | (2006.01) |
| *B41F 13/00* | (2006.01) |

(52) U.S. Cl.
CPC ............ *B41F 13/012* (2013.01); *B41F 13/14* (2013.01); *F16H 55/18* (2013.01); *B41F 13/00* (2013.01); *B41P 2213/202* (2013.01)

(58) Field of Classification Search
None
See application file for complete search history.

(56) References Cited

U.S. PATENT DOCUMENTS

| | | | | |
|---|---|---|---|---|
| 3,896,724 A | * | 7/1975 | Muselik .................. | B41F 13/14 101/248 |
| 4,408,526 A | * | 10/1983 | Mathes .................. | B41F 13/012 101/216 |
| 5,813,335 A | | 9/1998 | Burke et al. | |

(Continued)

FOREIGN PATENT DOCUMENTS

| | | |
|---|---|---|
| JP | 2002188708 A | 7/2002 |
| JP | 5401548 B2 | 1/2014 |

(Continued)

*Primary Examiner* — Jill E Culler
(74) *Attorney, Agent, or Firm* — The Webb Law Firm

(57) ABSTRACT

Plate cylinder driving devices of a printing machine are provided with a drive shaft driving the plate cylinder, a drive helical gear fixed to the drive shaft, and an anti-backlash helical gear rotatably connected to the drive shaft and is biased by at least a spring towards a direction for preventing backlash. Both the drive helical gear and the anti-backlash helical gear are engaged with the main gear, and a plate provided with plural holes accommodating rollers is provided between the drive helical gear and the anti-backlash helical gear. Friction between the anti-backlash gear and the drive gear is reduced by a simple mechanism in the plate cylinder driving devices in a printing machine.

4 Claims, 3 Drawing Sheets

(56) References Cited

U.S. PATENT DOCUMENTS

| | | | |
|---|---|---|---|
| 7,086,302 B2 * | 8/2006 | Ask | F16H 55/18 40/440 |
| 9,086,137 B2 | 7/2015 | Izume | |
| 9,446,581 B2 | 9/2016 | Yamasaki | |

FOREIGN PATENT DOCUMENTS

| | | |
|---|---|---|
| WO | 2012111091 A1 | 8/2012 |
| WO | 2016024997 A1 | 2/2016 |

* cited by examiner

F I G. 4
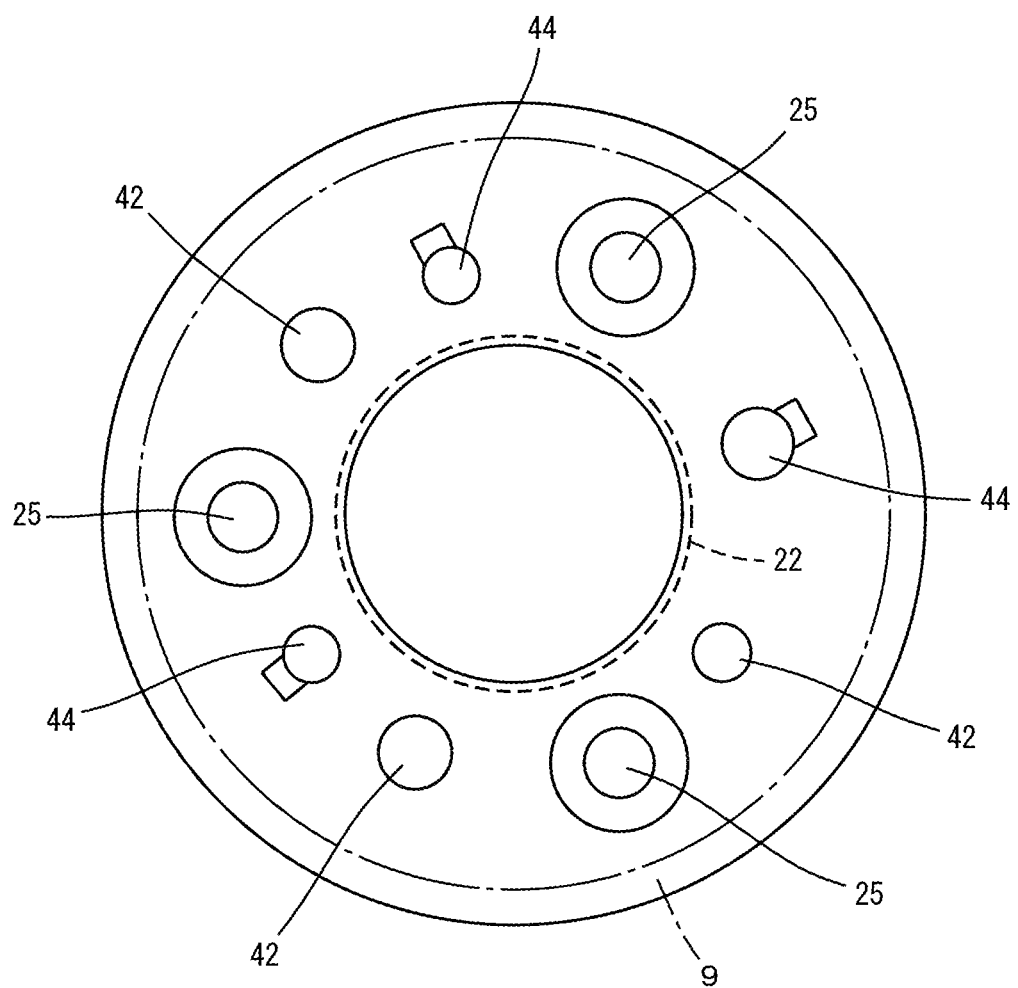

PRINTING MACHINE PROVIDED WITH PLATE CYLINDER DRIVING DEVICE

CROSS-REFERENCE TO RELATED APPLICATIONS

This application is the United States national phase of International Application No. PCT/JP2017/022037 filed Jun. 15, 2017, and claims priority to Japanese Patent Application No. 2016-132732 filed Jul. 4, 2016, the disclosures of which are hereby incorporated in their entirety by reference.

FILED OF THE INVENTION

The present invention relates to a printing machine provided with plate cylinder driving devices and in particular to the prevention of backlash between the main gear and drive shafts for individual plate cylinders.

DESCRIPTION OF RELATED ART

Printing machines such as those for printing cans have one main gear that drives drive shafts for individual plate cylinders so as to drive the individual plate cylinders in common by the main gear. The main gear comprises a helical gear and the main gear is associated with pairs of helical gears coupled to the drive shafts, respectively: one of each pair is for driving a drive shaft and the other for the prevention of backlash. The anti-backlash gear is biased by springs provided in the holder that is fixed to the drive shaft so that the anti-backlash gear advances further along the positive rotational direction of the drive shaft than the drive gear. The two gears that have separate phases engage the main gear, and thus the backlash is prevented (Patent Document 1: JP5401548B corresponding to U.S. Pat. No. 9,446,581).

CITATION LIST

Patent Document

Patent Document 1: JP5401548B corresponding to U.S. Pat. No. 9,446,581

SUMMARY OF THE INVENTION

Problems to be Solved by the Invention

The relative rotational angle (the phase) between the drive gear and the anti-backlash gear differs slightly between when the main gear is rotating and when it is not moving. When friction between the two gears is caused, it causes wear and cancels the biasing force from the springs. Since the biasing force between the two gears caused by the springs prevents the backlash, the friction hinders the due prevention of the backlash.

The object of the invention is to reduce by a simple mechanism the friction between the anti-backlash gear and the drive gear in the plate cylinder driving devices in a printing machine, thereby, to reduce the wear of those gears, and to utilize effectively the biasing force by the springs.

Means for Solving the Problems

The invention in the printing machine provided with the main gear and plate cylinder driving devices driving individual plate cylinders is characterized in:

that each of said plate cylinder driving devices is provided with a drive shaft driving a plate cylinder, a drive helical gear fixed to the drive shaft, and an anti-backlash helical gear which is rotatably connected to the drive shaft and is biased by at least a spring towards a direction for preventing backlash;

that the drive helical gear and the anti-backlash helical gear are both engaged with the main gear; and that a plate provided with plural holes in which rollers are accommodated is provided between the drive helical gear and the anti-backlash helical gear.

According to the invention, the relative rotation between the two helical gears are supported by the rollers in the plate. Therefore, the friction between the gears is reduced, and, when the main gear stops, the anti-backlash gear is pressed towards the main gear due to the biasing force of the spring and prevents the backlash of the drive gear fixed to the drive shaft. Further, instead of normal bearings, the simple bearing in which the plate accommodates the rollers in the holes is enough. Further, the rollers contact the two gears without sliding motions between them, and they reduce the wear of the gears.

While the rollers may be ball rollers, however, column shape rollers, circular in a radial section thereof, and have axial directions perpendicular to the drive shaft are preferable. Further preferably, the axial directions of the rollers are coincident with the extensions of diameters of the drive shaft. The column shape rollers are capable of supporting the pressure acting between the gears, since they support the load with a line contact. Further, since the axial directions of the rollers are perpendicular to the drive shaft, they are capable of supporting the relative rotation between the two gears. The materials of the rollers may be a metal or a ceramics.

The plate has a simple structure where the rollers are accommodated within the holes. For preventing the plate from wearing due to the contact with the rollers, a plate made of synthetic resin is preferable. A plate made of self-lubricating synthetic resin is further preferable. Since the inside of a printing machine may be heated to an elevated temperature, a synthetic resin having an upper limit for the normal operating temperature larger than or equal to 150-degree Celsius, for example, poly-ether-ether-ketone, poly-phenylene-sulfide, polyimide, or the like is preferable.

Most preferably, to both the drive helical gear and the anti-backlash helical gear, at contact areas with the rollers, are fixed contact members in contact with the rollers. Since rollers are usually made of hard materials, the helical gears may easily wear. If the entire helical gears are made of hard materials, the gear shaping becomes difficult. On the contrary, when the contact members are provided on the contact areas with the rollers, the wear of the gears is prevented, and the gear is shaped without difficulty.

DESCRIPTION OF THE INVENTION

The best embodiment for carrying out the invention will be described in the following embodiment.

Figure 1:
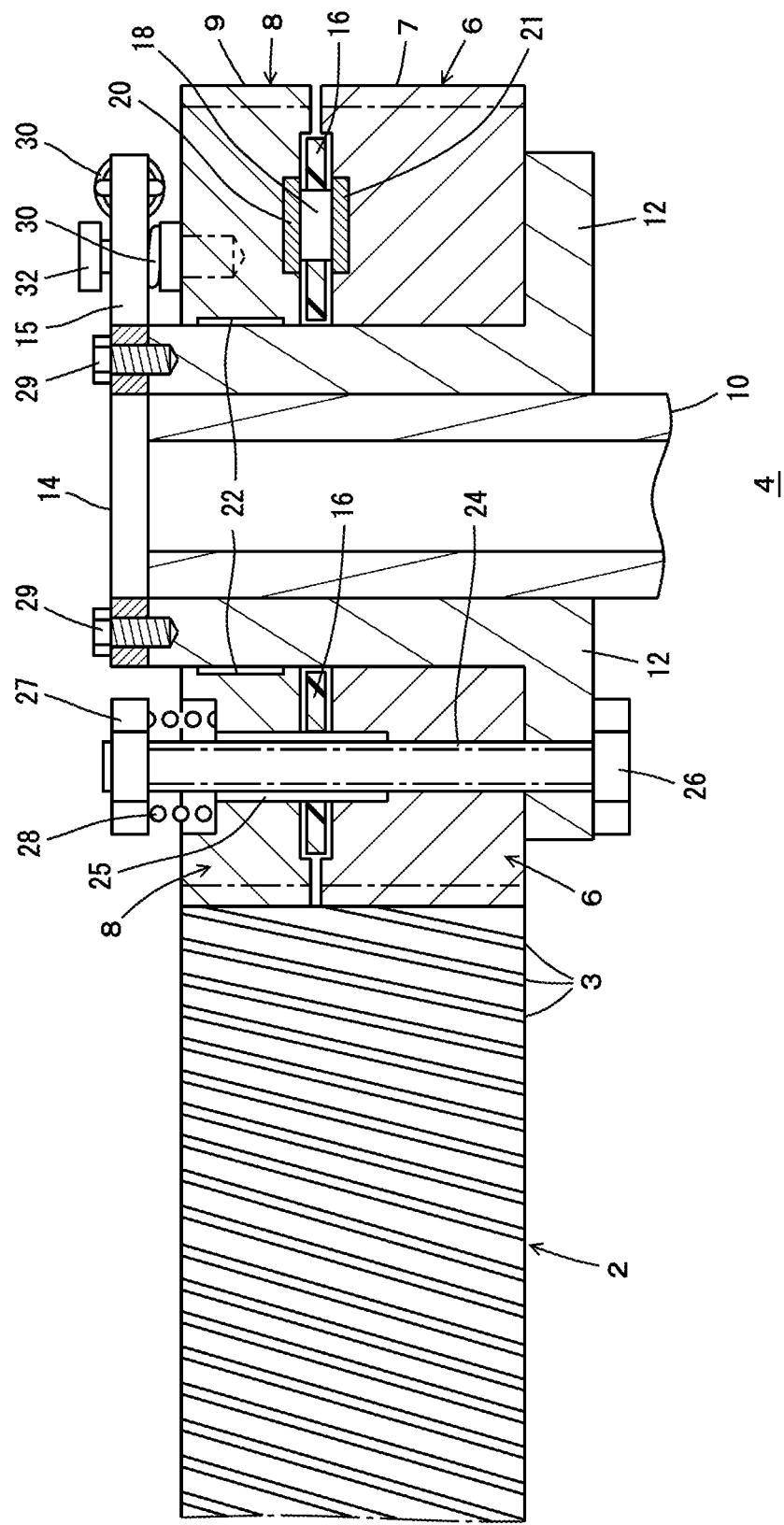
FIG. 1 A partial vertical sectional view of a printing machine according to an embodiment FIG. 2 A front view of the drive helical gear and the plate according to the embodiment FIG. 3 A partial sectional view of the plate and the helical gears FIG. 4 A front view of the anti-backlash helical gear

FIGS. 1 to 4 indicate a printing machine according to the embodiment. As shown in FIG. 1, the main gear 2 of the printing machine is associated with plate cylinder driving devices 4 for each color component. Each plate cylinder driving device 4 is equipped with a drive helical gear 6, an anti-backlash helical gear 8, a drive shaft 10, and so on, and drives the plate cylinder unshown by the drive shaft 10. In addition, the helical teeth 3 of the main gear 2 are associated with the helical teeth 7 and 9 of the gears 6 and 8 respectively. Further, the gears 2, 6, 8 are cylindrical gears according to the embodiment; however, they may be bevel gears or hypoid gears.

To the drive shaft 10, a coupling member 12 is joined for example by an unshown key and the drive helical gear 6 is coupled with the coupling member 12 by stud bolts 26. The drive helical gear 6 is provided with holes 24 threaded partly and the threaded holes 24 are engaged with the stud bolts 26. The stud bolts 26 penetrates through holes 25 in the anti-backlash gear 8, and the anti-backlash gear 8 is biased towards the drive gear 6 by nuts 27 and coil springs 28 in order to keep the gears 6, 8 in parallel. A gap 22 is provided between the coupling member 12 and the gear 8 in order to reduce the friction between them. This construction allows the gear 8 to rotate within the clearance between the through holes 25 and the stud bolts 26 relative to the gear 6. The connection mechanism of the gears 6, 8 to the coupling member 12 is arbitrary and is not limited to the stud bolts 26 shown in figures or the like.

At one end of the coupling member 12, a holder 14 is fixed by bolts 29. The holder 14 is provided with plural arms 15, and the arms 15 hold one ends of tensile springs 30 respectively. The other ends of the tensile springs 30 are connected to bolts 32 or other connection members so as to be connected with the gear 8. In this way, the anti-backlash gear 8 is biased relative to the drive gear 6 towards the positive rotational direction of the gears 6, 8. The biasing springs are not limited to the shown tensile springs 30 but may be compression springs or flat springs.

Between the gears 6, 8, a heat-resistant and self-lubricating plate 16 made of a synthetic resin is provided. The plate 16 consists of poly-ether-ether-ketone, poly-phenylene-sulfide, polyimide, or the like and is provided with plural holes: rollers 18 accommodated within the holes are in contact with the gears 6, 8. The rollers 18 are made of a hard steel or the like, have a column shape which is circular in a radial section, and the axes of them are perpendicular to the drive shaft 10. To the gears 6, 8, are joined and fixed plural contact members 20, 21 respectively, made of hard steels or the like, at areas in contact with the rollers 18.

Figure 2:
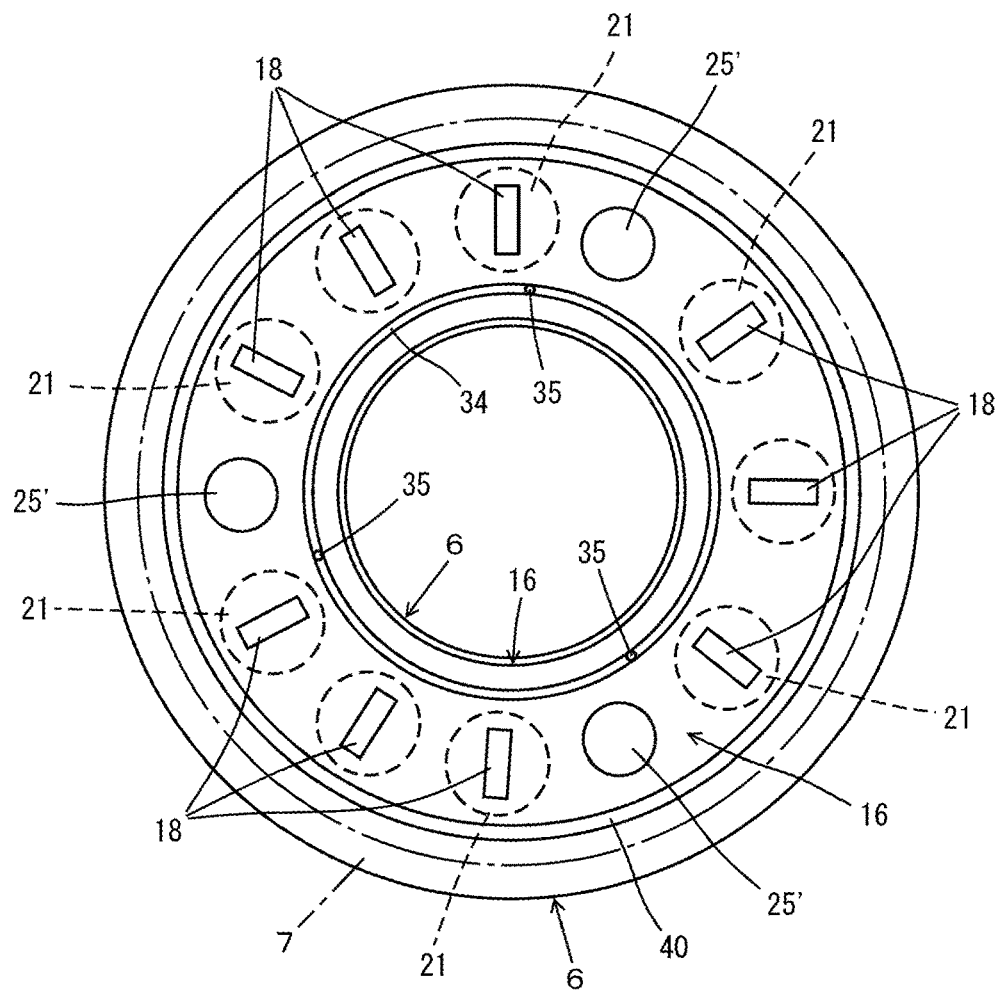
Figure 3:
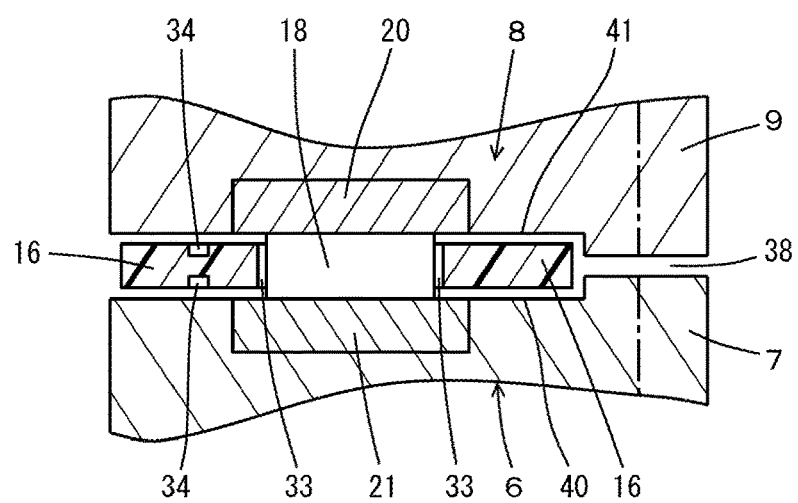

FIGS. 2 and 3 indicate the alignment of the plate 16 to the gears 6 and 8. The gears 6 and 8 are provided with ring-like recesses 40 and 41 respectively, and, within the recesses 40 and 41, the plate 16 is accommodated: the plate 16 do not have a substantial contact with the gears 6, 8. The plate 16 has holes 33 which accommodate the rollers 18, and a gap 38 in the vicinity of the helical teeth 7, 9 is provided between the gears 6, 8. Further, the plate 16 has holes 25' through which the stud bolts 26 penetrate.

The plurality of the rollers 18, the plurality of the holes 33, and the plurality of the contact members 20 and 21 are respectively provided, and the plurality of holes 24 and the plurality of holes 25 are provided. The plate 16 has grooves 34 in its front and rear faces to supply a lubricant such as a grease or a lubricating oil between the rollers 18 and the contact members 20, 21, and the face and rear grooves 34 are connected through at least a through hole 35.

FIG. 4 depicts the gear 8: the gear 8 is provided with the plural holes 25 for making the stud bolts 26 pass and plural screw holes 42 for fixing the bolts 26 and it is further provided with at least a lubricant inlet 44 connected to the groove 34.

The functions of the embodiment will be described. The plate cylinders of the printing machine are driven by the drive shafts 10 so as to move synchronously with the main gear 2. When the main gear 2 rotates along the positive direction, the helical gears 7 of the drive shaft 6 are engaged with and are driven by the helical teeth 3 of the main gear 2, and, when the main gear 2 stops, the gear 6 tends to further rotate. At this instance, the anti-backlash gear 8 is biased by the tensile springs 30 towards the positive rotational direction of the main gear 2 and therefore it inhibits the inertial rotation of the gear 6 towards the positive direction. As a result, when the main gear 2 stops, the gear 6 stops simultaneously, and the drive shaft 10 is driven accurately and without backlash.

When the main gear 2 stops, the gears 6 and 8 rotate relatively at a slight extent. This rotation is supported by the rollers 18, therefore, the biasing force by the tensile springs 30 are not canceled by the friction, and the backlash is reliably prevented. Note that the axial directions of the rollers 18 are perpendicular to the drive shaft 10 and that they are capable of supporting the relative rotation between the gears 6 and 8 when the main gear 2 stops.

The rollers 18 consist of the harder material than that for the gears 6, 8, and therefore, the contact members 20, 21 are provided in order to prevent the gears 6, 8 from being worn. The lubricant is supplied via the lubricant inlet 44, the grooves 34, and the through hole 35 and it prevents the wear of the rollers 18 and the contact members 21 and 22.

Since the plate 16 consists of the heat-resistant and self-lubricating synthetic resin, it may be used when the inside of the printing machine becomes heated to an elevated temperature and it wears very slowly due to its self-lubricating property.

The inventive feature of the invention lies in the reduction of wear of the gears 6 and 8 by the rollers 18 accommodated within the holes of the plate 16, and other features may adequately be altered. In particular, the connection of the gear 8 to the gear 6 and to the drive shaft 10, the connection of the holder 14, and the species and the connection of the springs 30 are arbitrary.

| DESCRIPTION OF SYMBOLS | | | | | |
|---|---|---|---|---|---|
| 2 | main gear | 3 | helical tooth | 4 | plate cylinder driving device |
| 6 | drive helical gear | 8 | anti-backlash helical gear | | |
| 7, 9 | helical tooth | 10 | drive shaft | 12 | coupling member |
| 14 | holder | 15 | arm | 16 | plate |
| 18 | roller | 20, 21 | contact member | 22 | gap |
| 24, 25 | hole | 26 | stud bolt | 27 | nut |
| 28 | coil spring | 29 | bolt | 30 | tensile spring |

| DESCRIPTION OF SYMBOLS | | | | | |
|---|---|---|---|---|---|
| 32 | bolt | 33 | hole | 34 | groove |
| 35 | through hole | 38 | gap | 40, 41 | recess |
| 42 | screw hole | 44 | lubricant inlet | | |

The invention claimed is:

1. A printing machine comprising a main gear and plate cylinder driving devices driving individual plate cylinders wherein:

each of said plate cylinder driving devices is provided with a drive shaft driving a plate cylinder, a drive helical gear fixed to the drive shaft, and an anti-backlash helical gear which is rotatably connected to the drive shaft and is biased by at least a spring towards a direction for preventing backlash;

the drive helical gear and the anti-backlash helical gear are both engaged with the main gear; and a plate provided with plural holes in which rollers are accommodated is provided between the drive helical gear and the anti-backlash helical gear.

2. The printing machine provided with plate cylinder driving devices according to claim 1, wherein said rollers have a column shape, circular in a radial section thereof, and have axial directions perpendicular to the drive shaft.

3. The printing machine provided with plate cylinder driving devices according to claim 1, wherein said plate is made of synthetic resin.

4. The printing machine provided with plate cylinder driving devices according to claim 1, wherein contact members are fixed to both the drive helical gear and the anti-backlash helical gear respectively and are in contact with the rollers, at contact areas with the rollers.

* * * * *